United States Patent
Macwan

(10) Patent No.: US 8,700,073 B2
(45) Date of Patent: Apr. 15, 2014

(54) METHOD AND APPARATUS FOR PROVIDING MOBILE MESSAGING ENABLED EVENT PLANNING, SCHEDULING AND TRACKING SERVICE

(75) Inventor: Sanjay Macwan, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 429 days.

(21) Appl. No.: 12/643,923

(22) Filed: Dec. 21, 2009

(65) Prior Publication Data
US 2011/0151897 A1    Jun. 23, 2011

(51) Int. Cl.
*H04L 29/06*    (2006.01)
*H04W 4/00*    (2009.01)

(52) U.S. Cl.
USPC .................................. 455/466; 455/414.3

(58) Field of Classification Search
USPC ............. 455/466, 412.1–412.2, 414.1–414.3, 455/418–420; 370/328, 338, 312
See application file for complete search history.

(56) References Cited

U.S. PATENT DOCUMENTS

| | | | |
|---|---|---|---|
| 2006/0221918 A1* | 10/2006 | Wang | 370/338 |
| 2007/0070940 A1* | 3/2007 | Vander Veen et al. | 370/328 |
| 2007/0073808 A1* | 3/2007 | Berrey et al. | 709/204 |
| 2008/0103918 A1* | 5/2008 | Burnette et al. | 705/26 |
| 2008/0294994 A1* | 11/2008 | Kruger et al. | 715/733 |
| 2009/0029724 A1* | 1/2009 | Hardy et al. | 455/466 |
| 2009/0111438 A1* | 4/2009 | Chan | 455/414.2 |
| 2009/0137233 A1* | 5/2009 | Hinds et al. | 455/414.3 |
| 2009/0191902 A1* | 7/2009 | Osborne | 455/466 |
| 2010/0274855 A1* | 10/2010 | Wassingbo | 709/206 |
| 2011/0087529 A1* | 4/2011 | Angell | 705/14.13 |
| 2011/0105157 A1* | 5/2011 | Nguyen et al. | 455/466 |
| 2011/0131090 A1* | 6/2011 | Kaplan | 705/14.26 |
| 2011/0136516 A1* | 6/2011 | Ellis | 455/458 |

* cited by examiner

*Primary Examiner* — Brandon Miller

(57) ABSTRACT

A method and computer readable medium for providing a mobile messaging event planning service in a communications network are disclosed. For example, the method assigns a mobile messaging identification code for an event, receives a text message including the mobile messaging identification code for the event and provides information associated with the event in response to the text message.

18 Claims, 5 Drawing Sheets

METHOD AND APPARATUS FOR PROVIDING MOBILE MESSAGING ENABLED EVENT PLANNING, SCHEDULING AND TRACKING SERVICE

BACKGROUND

Often event information is provided through various channels such as flyers, billboards, electronic notifications (email, newsletters, etc), print advertisements (magazines, newspaper, etc.), radio or TV announcements. However, there is often no easy way to put the events of interests on our calendars unless one specifically opens a calendar application or physically write it into a paper calendar. Generally, people save the flyer or write down the information and then manually enter the information on their calendar when they arrive home or in the office. Additionally, the event flyers and other forms of notifications may not have all the details that an individual is interested in (e.g., due to the limited size of a billboard) and the individual must then perform another action e.g., visiting a home page or calling a telephone number to get the additional details.

In other cases, a person may be traveling too fast to read all of the information on a billboard. For example, people do not have enough time to carefully read all the information on a billboard when they are driving by a billboard. In addition, a driver cannot write any information down because their hands are on the driving wheel. As a result, various channels for distributing or publishing event information may lose its effectiveness.

SUMMARY

In one embodiment, the present disclosure teaches a method and computer readable medium providing a mobile messaging event planning service in a communications network. For example, the method assigns a mobile messaging identification code for an event, receives a text message including the mobile messaging identification code for the event and provides information associated with the event in response to the text message.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
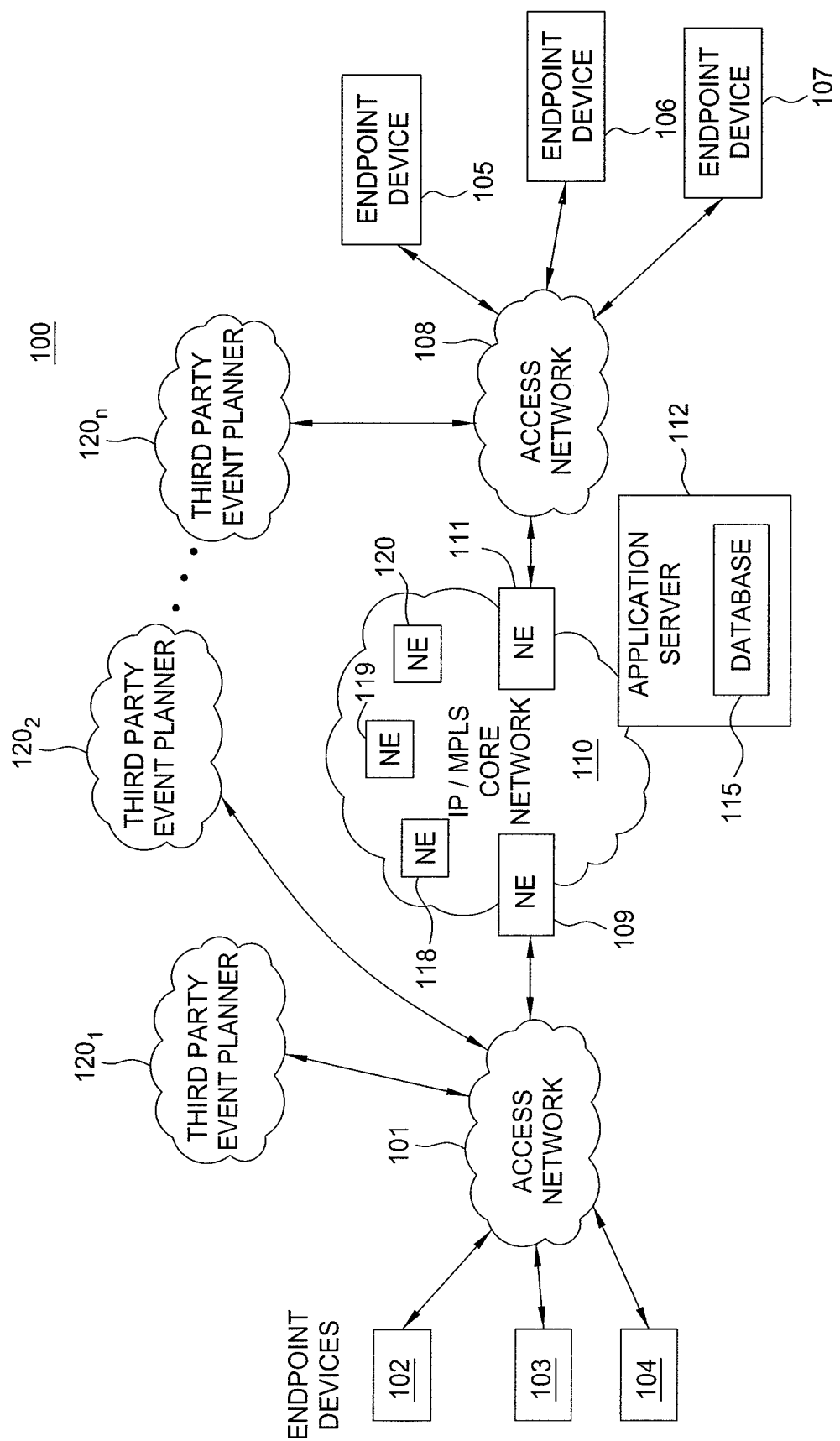
FIG. 1 illustrates an exemplary network related to the present disclosure.

The present disclosure broadly discloses a method, computer readable medium and an apparatus for providing mobile messaging event planning, e.g., short message service (SMS) enabled event planning, scheduling and tracking in a communications network. FIG. 1 is a block diagram depicting an exemplary communications network 100 related to the current disclosure. Exemplary networks include cellular networks, packet networks, internet protocol networks, wireless networks, and the like.

FIG. 1 is a block diagram depicting an exemplary packet network 100 related to the current disclosure. Exemplary packet networks include packet networks, e.g., Internet Protocol (IP) networks, IP Multimedia Subsystem (IMS) networks, Asynchronous Transfer Mode (ATM) networks, Frame-Relay networks, and the like. An IP network is broadly defined as a network that uses Internet Protocol such as IPv4 or IPv6, and the like to exchange data packets.

In one embodiment, the packet network may comprise a plurality of endpoint devices 102-104 configured for communication with a core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers (e.g., broadly as a border element) for the network 110.

The endpoint devices 102-107 may comprise customer endpoint devices such as personal computers, laptop computers, Personal Digital Assistants (PDAs), mobile telephones, smart phones, servers, routers, and the like. The access networks 101 and 108 serve as conduits to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a cellular network, and the like.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device.

The IP/MPLS core network 110 may also comprise an application server 112 that contains a database 115. The application server 112 may comprise any server or computer that is well known in the art, and the database 115 may be any type of electronic collection of data that is also well known in the art. In addition, it should be noted that the application server 112 may be physically within the IP/MPLS core network 110 or may be offloaded outside of the IP/MPLS core network 110 and operated by a third party. In one embodiment, the application server 112 may host a mobile messaging event planning application to enable event planning, scheduling and tracking.

In one embodiment, one or more third party event planners 120$_1$-120$_n$ (hereinafter also collectively referred to as third party event planners 120) may be in communication with the IP/MPLS core network 110. The third party event planners 120 can be a company (e.g., a clothing store, a bookstore, a restaurant, a bar and the like), a charity, an individual or a group of people (e.g., a local school, a club, an association, and the like). The third party event planners 120 can plan any type of event. For example, a book store may hold a story time reading event or a book signing event; a restaurant or bar may be holding a concert; a charity may be hosting a charitable dinner, auction or wine tasting event; an individual may be hosting a party; a group of students may be holding a fundraising car wash, and so forth.

Each of the third party event planners 120 can access the application server 112 in the core network 110 via an access network 101 or 108. In one embodiment, the third party event planners 120 can register an event and specific details associated with the event (e.g., date, time, location, etc.) with the application server 112. Further details of this process are discussed below.

It should be noted that although only six endpoint devices, two access networks, and five network elements are depicted in FIG. 1, the communication system 100 may be expanded by including additional endpoint devices, access networks, network elements, application servers or third party applications without altering the scope of the present disclosure. The current disclosure provides mobile messaging event planning services, e.g., SMS enabled event planning, scheduling and tracking in a communications network, e.g., the network 100 illustrated in FIG. 1, and as described below.

Figure 2:
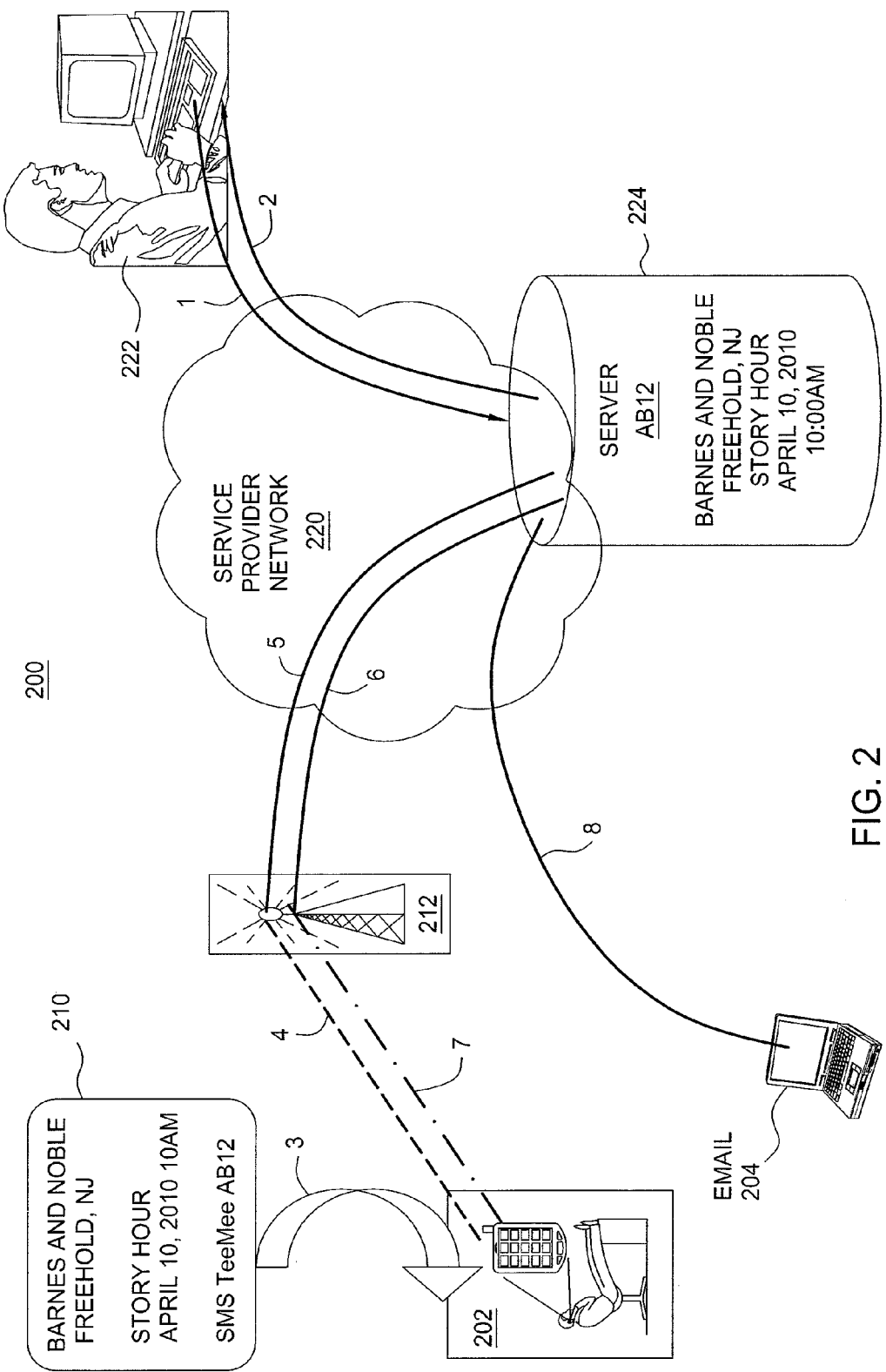
FIG. 2 illustrates a high level block diagram of the present disclosure.

FIG. 2 illustrates a high level block diagram of one embodiment of a system 200 for providing mobile messaging event planning services, e.g., short message service (SMS) enabled event planning, scheduling and tracking in a communications network. In one embodiment, the system 200 includes an endpoint 202 and an endpoint 204 associated with the same user, a service provider network 220, a server 224 for mobile messaging event planning services, e.g., SMS enabled event planning, scheduling and tracking and a third party event planner 222. The endpoints 202 and 204 may be similar to any of the endpoints 102-107, the service provider network 220 may be similar to the IP/MPLS core network 110, the server 224 may be similar to the server 112 and the third party event planner 222 may be one of the third party event planners 120 illustrated in FIG. 1.

One embodiment of a sequence for providing short message service (SMS) enabled event planning, scheduling and tracking in a communications network is illustrated by numbered lines or flows in FIG. 2. First, represented by line 1, the third party event planner 222 registers an event with the service provider network 220. As discussed above, the third party event planner 222 may be any type of company, charity, individual or group.

For example, a Barnes and Noble® in Freehold, N.J. may be holding a story hour session for children on Apr. 10, 2010 at 10:00 AM. The Barnes and Noble®, as one example of a third party event planner 222, registers detailed information about the event with the service provider network 220. The detailed information may include a time of the event, a date of the event, a location of the event, a description of the event, a telephone number for a main contact for the event, and the like.

In one embodiment, the detailed information is then stored in the server 224. The service provider 220 then assigns a unique mobile messaging identification (ID) code, e.g., a unique SMS ID code, for the registered event. For example, the story hour event hosted by Barnes and Noble® is assigned a unique SMS ID code of "AB12" or "BARNES-NOBLE_AB12".

Preferably, each mobile messaging ID code for the registered events is relatively short and easy to remember. For example, the mobile messaging ID code may only be a few letters and numbers. Alternatively, the mobile messaging ID code may be a word related to the event (e.g., WINETASTE for a charity wine tasting event or "STORYTIME" for the story hour). In one embodiment, the mobile messaging ID code can be composed of a company name followed by a unique code. This will allow a greater number of mobile messaging ID codes, where a user only needs to remember the last portion of the mobile messaging ID code.

In example using SMS based text messages, the third party event planner 222 may pay a fee to the service provider for registration of the event and the assignment of the unique SMS ID code associated with the event. Any type of fee structure can be implemented. For example, the third party event planner 222 may be charged a one-time fee. Alternatively, the third party event planner 222 may be charged on a per upload fee (e.g., charged for each time the detailed information is uploaded to a user requesting the information). In another embodiment, the third party event planner 222 may be charged a flat fee for the first 200 uploads and then on a per upload basis thereafter.

In another embodiment, the service can be free to the third party event planner 222 and entirely supported by advertisement based revenue. For example, the service provider may track which events are uploaded to users. The service provider may analyze what types of events are uploaded to which users. This information can then be provided to companies that pay for targeted advertisements to specific users.

Whatever the fee structure may be, after the third party event planner 222 registers the event with the service provider network 220, the third party event planner 222 receives the unique SMS ID code associated with their event from the service provider network 220, represented by line 2. The third party event planner 222 may then publish the unique SMS ID code associated with their event.

The third party event planner 222 may use cost effective ways to spend a nominal amount of resources or money to publish the unique SMS ID code associated with their event. Thus, cost savings are achieved by paying a lower fee for the mobile messaging event planning service, rather than paying the high cost of advertising the event on multiple billboards, printing thousands of flyers, and the like. For example, the third party event planner 222 may already have a database of customers who subscribe to various enrolls or newsletters. The third party event planner 222 may simply email the unique SMS ID code associated with the event to their subscribers.

Alternatively, any advertisements or published flyers that a third part event planner does pay for becomes more effective with the unique SMS ID code. The unique SMS ID code can be read quickly and remembered easily even if the person is driving by a billboard or walking by a posted flyer. For example, an advertisement may indicate "special sales event for furniture to be held at the arena on Dec. 20, 2010, Text message SMS ID code "XYZ123". A person who reads the advertisement or flyer only needs to remember the unique SMS ID code for the event. All of the detailed information can be obtained at a later time using the unique SMS ID code. Also, the person's a calendar is automatically updated with the detailed event information, as discussed below.

In addition, the unique SMS ID code allows individuals to more easily spread word of the event. For example, an individual may be driving on a highway and spot a large billboard advertising an event. The event may be of some interest to either the individual or someone the individual knows. Typically, the individual driving has no time to read various details about the event when he is driving. However, using the present disclosure, the individual sees the unique SMS ID code, e.g., "XYZ123" and only needs to remember the unique SMS ID code. As a result, the individual can simply tell a family member or friend who might be interested in the event to text message "XYZ123" for more details of the event.

Thus, line 3 represents a user who sees the published event either on a flyer, a billboard, an email or the like. In this particular example, the event is a story hour and the user sees the unique SMS ID code of "AB12". In one embodiment, the user may SMS text message "AB12" on their endpoint device 202. The SMS text message is sent wirelessly represented by line 4 via a wireless tower 212 to the service provider network 220 represented by line 5. It should be noted that the text message is not send to another end user, but instead is sent to a mobile messaging event planning service for enabling event planning, scheduling and tracking, as discussed below.

In one embodiment, a separate mobile application may be created for the mobile messaging event planning service, e.g., a short message service (SMS) enabled event planning, scheduling and tracking service. This mobile application can be deployed in a mobile endpoint device. For example, the mobile application may simply require the user to provide a single input, e.g., the unique SMS ID code associated with an event. The mobile application can then automatically generate and send an SMS text message to the service provider network 220 for the user.

In one embodiment, the service provider network 220 looks up the event associated with the unique SMS ID code "AB12" in the server 224. In this particular example, the unique SMS ID code "AB12" is associated with a story hour session for children on Apr. 10, 2010 at 10:00 AM at Barnes and Noble® in Freehold, N.J.

Upon receipt of the SMS ID code "AB12," the server 224 will automatically associate that message as a request for information associated with that SMS ID code "AB12." For example, the service provider network 220 obtains the detailed information for the event from the server 224 and sends the information back to the user represented by line 6 and line 7. In one embodiment, the information may be used to automatically update a calendar on the endpoint device 202 of the user. For example, the information includes the date and time of the event. As a result, a date and time slot on a calendar on the user's endpoint device is automatically updated to include the detailed event information.

In one alternate embodiment, the user is presented with an option, (i.e. a notification) as to whether he or she would like to insert the event into his or her calendar. This will allow the user to evaluate whether he or she wants to attend the event. Furthermore, the notification may contain a plurality of possible dates and times that a user can select, if the event is ongoing for a number of days and different time slots.

In addition, the information may provide an address for the location of the Barnes and Noble® in Freehold, N.J. and a telephone number for a main contact of the event. As a result, the user may simply click on the number to call the main contact if necessary. Also, the address information can be used to map directions on the endpoint device to the event.

In one embodiment, the user may be charged a fee for requesting the event information via the unique SMS ID code associated with the event. For example, the user may incur a charge in their mobile service bill. Additional fees may be collected from the user for other actions associated with the event. For example, if the user requests the address be mapped and the directions be provided, the user could be charged a nominal fee (e.g., $0.99 and so on) for the service. It should be noted that any combination of any of the fee structures described above with respect to the third party event planner 222 and the user can be implemented. For example, only the third party event planner 222 can be charged, only the user can be charged, both the third party event planner and the user can be charged or no one will be charged.

FIG. 2 also illustrates a line 8 going to another endpoint device 204 of the user. In one embodiment, the user may pre-define which endpoint device that will receive the detailed information. For example, the user may store their calendar on a home or office desktop computer that is not synchronized with their mobile endpoint device 202. As a result, although the user sends the SMS text message with his mobile endpoint device 202, the user may have the detailed information associated with a particular event sent to a different endpoint device 204 (e.g. a home or office desktop computer).

The user may pre-define their preferences with the service provider network 220. For example, the service may be provided on a subscription basis where the user may store a user profile in the service provider network (e.g., server 224). Alternatively, a response text message may be sent to the user the first time (or every time i.e., on a per session basis) the service is used asking to specify which device should receive the detailed information. In other words, the user may instruct the mobile messaging event planning service as to which device to send the detailed information. Thus, the user may have the detailed information sent in response to their SMS text message having the unique SMS ID code associated with an event to any endpoint device of their choosing.

The mobile messaging event planning service may be associated with a unique name. In one embodiment, the service is deployed as a "TeeMee" service. Thus, the unique SMS ID code can be sent to a TeeMee application server. For example, user can SMS text "TeeMee AB12" for the story hour example provided above.

The system 200 can also be used to send network based reminders or automatic updates for the event. For example, the service provider network 220 can track what events have been uploaded to which users based upon the SMS text messages that are received. Each user can specify when they would like to be reminded about events that they have downloaded into their calendars from the service provider network 220 (e.g., via a user profile in the service provider network 220). As a result, the service provider network 220 can send a reminder text message before the event begins in accordance with the user's specifications.

As noted above, the system 200 can also be used for automatic updates for the event. In one embodiment, the service provider network 220 can monitor if there are any changes to the event (e.g., a time change, a date change, a location change, etc.). For example, the third party event planner 222 may register a change to the event with the service provider network 220. When the service provider network 220 detects a change associated with a registered event, the service provider network 220 can automatically update the calendars of all users who have downloaded the event onto their respective calendars.

This allows the third party event planner 222 from contacting all users or mass publishing changes to their events and saves the user time for constantly checking to see if any changes to the event have occurred. For example, if an event is canceled due to inclement weather, the third party event planner 222 can simply cancel the event with the service provider network 220. Accordingly, the service provider network 220 can automatically send updates to all the users' calendars that downloaded the detailed information for the event to notify them that the event is canceled.

In one embodiment, the detailed information sent to the user, the reminder or the automatic update can contain targeted advertising. For example, the user who downloads detailed information about the story hour session for children at Barnes and Noble® may be presented with coupons to Barnes and Noble® or an advertisement to join a book of the month club. In another example, suggestions for similar events that the user may enjoy based upon the downloaded detailed information may be provided (e.g., a book signing at a Borders® or a story hour at a local library).

Figure 3:
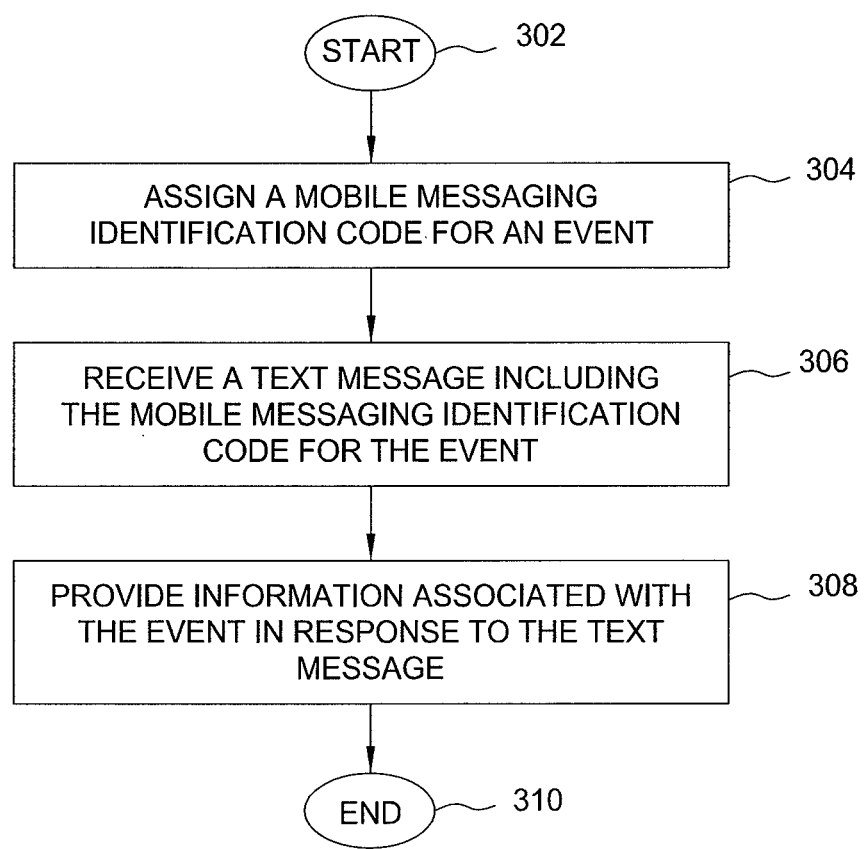
FIG. 3 illustrates a flowchart of a method for providing mobile messaging event planning in a communications network.

FIG. 3 illustrates a flowchart of a method 300 for providing a mobile messaging event planning service. In one embodiment, one or more steps of the method 300 can be implemented by the application server 112, server 224 or a general purpose computer having a processor, a memory and input/output devices as discussed below with reference to FIG. 5.

The method 300 begins at step 302. At step 304, the method 300 assigns a mobile messaging ID code for an event. As discussed above, a third party event planner registers an event with the service provider network. Once the third party event planner has provided detailed information about the event (e.g., date, time, location, main contact information, etc.) the server will assign a mobile messaging ID code, e.g., a unique SMS ID code, with the event. The mobile messaging ID code is also provided to the third party event planner. The detailed information can be stored in a server within the service provider network.

It should be noted that the mobile messaging event planning service may also be provided by a different company than the service provider of the communications network. In other words, a third party provider may provide the mobile messaging event planning service via the service provider network to users and third party event planners.

As discussed above, a unique SMS ID code is assigned for each event that is registered by one or more third party event planners. In exchange for registering the events and assigning the unique SMS ID codes, a fee may be collected from the third party event planners. Any fee structure discussed above with reference to FIG. 2 can be implemented.

At step 306, the method 300 receives a text message including the mobile messaging ID code for the event. For example, a user of an endpoint device may see a flyer, a billboard or an email promoting an event registered by a third party planner where the mobile messaging code assigned in step 304 is presented. The event is of interest to the user and the user simply remembers a unique SMS ID code associated with the event.

In the example discussed above, Barnes and Noble® is hosting a story hour. The unique SMS ID code associated with the event is "AB12". Thus, if the mobile messaging event planning service is called "TeeMee", the user simply SMS text messages "TeeMee AB12" to receive the detailed information associated with the event. It should be noted that "TeeMee" is only illustrative. In other words, the user simply sends the message "AB12" to an address that is associated with the mobile messaging event planning service.

At step 308, the method 300 provides information associated with the event in response to the text message. For example, the unique SMS ID code identifies a particular event that was previously registered by a third party planner. Detailed information associated with the particular event is obtained and provided to a user in response to the SMS text message. The detailed information can include a date of the event, a time the event starts, a location or an address of the event, a telephone number for a main contact of the event, a description of the event, and the like.

In one embodiment, the detailed information is used to automatically populate information on a calendar 2n an endpoint of the user requesting the detailed information. For example, the user can specify one of a plurality of endpoint devices that should receive the detailed information. For example, the user may send the SMS text message with their mobile telephone, but keep their calendar on a home or office desktop computer. As a result, the detailed information may be sent to the user's home or office desktop computer.

In one embodiment, once received at the designated endpoint device, the detailed information automatically populates the calendar on the endpoint device. For example, referring back to the example above where Barnes and Noble® is hosting a story hour at 10:00 AM on Apr. 10, 2010, the detailed information may populate Apr. 10, 2010 at 10:00 AM on the calendar of the endpoint device with the detailed information of the event. In other words, the time slot of Apr. 10, 2010 at 10:00 AM of the calendar will be updated to contain a description of the event, a location or address of the event, a telephone number for a main contact of the event and the like.

From the information on the user's endpoint device, the user may take additional action. For example, the user may click on an address provided by the detailed information to automatically map directions to the event or the user may click on the telephone number to automatically place a call to the main contact for the event, if the user has some questions about the event and so forth. The user can even forward the event as an "invite" to the user's friends and family. The method 300 ends at step 310.

Figure 4:
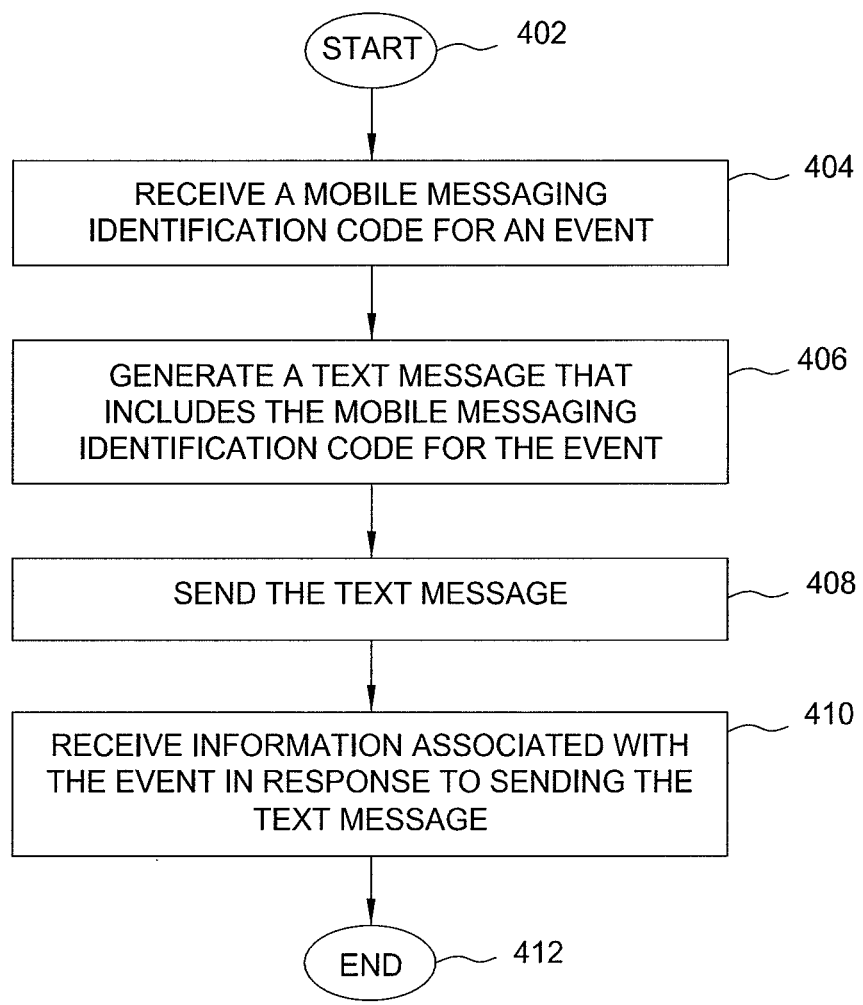
FIG. 4 illustrates a flowchart of another method for providing mobile messaging event planning in a communications network.

FIG. 4 illustrates a flowchart of a method 400 for providing a mobile messaging event planning service. In one embodiment, one or more steps of the method 400 can be implemented by any one of the endpoint devices 102-107, 202, 204 or a general purpose computer having a processor, a memory and input/output devices as discussed below with reference to FIG. 5.

The method 400 begins at step 402. At step 404, the method 400 receives a mobile messaging ID code for an event. For example, a user may see a flyer, a billboard or receive an email about an event. The event is of interest to the user or somebody the user knows and the user simply remembers the mobile messaging ID code, e.g., a unique SMS ID code. Then, the mobile messaging ID code is entered into an endpoint device of the user.

At step 406, the method 400 generates a text message that includes the mobile messaging ID code for the event. For example, after the user enters the mobile messaging ID code, e.g., a unique SMS ID code, into their endpoint device, the endpoint device will automatically generate a text message, e.g., an SMS text message, that includes the mobile messaging ID code for the event.

At step 408, the method 400 sends the text message. In one embodiment, the user's endpoint device may execute a mobile application program that automatically generates and sends the text message after the user inputs the mobile messaging ID code. In other words, with a single input, the mobile application program can automatically generate and send the text message including the mobile messaging ID code. Alternatively, the user can manually generate and send the text message including the mobile messaging ID code.

In one embodiment, the text message is sent (e.g., via an address) to a server that stores a plurality of events registered by one or more third party event planners. Each of the plurality of events is associated with a mobile messaging ID code. The server can be in the service provider network or may be in communication with the service provider network and operated by a third party provider.

The mobile messaging ID code sent in the text message identifies a particular event in the server. For example, if the mobile messaging ID code is "AB12", the server would correlate the mobile messaging ID code with the Barnes and Noble® story hour registered by a third party event planner that was assigned the mobile messaging ID code of "AB12".

The server obtains the detailed information associated with the event having the mobile messaging ID code sent by the user in the text message and sends the detailed information to the user.

At step 410, the method 400 receives information associated with the event in response to sending the text message. The information contains detailed information of the event associated with the mobile messaging ID code sent in the text message. The detailed information can include a date of the event, a time the event starts, a location or an address of the event, a telephone number for a main contact of the event, a description of the event, and the like.

The detailed information is used to automatically populate information on a calendar on one of the user's endpoint devices. For example, the user can specify one of a plurality of endpoint devices that should receive the detailed information. For example, the user may send the text message with their mobile telephone, but keep their calendar on a home or office desktop computer. As a result, the detailed information may be sent to the home or office desktop computer.

Once received at the designated endpoint device, the detailed information automatically populates the calendar on the endpoint device. For example, referring back to the example above where Barnes and Noble® is hosting a story hour at 10:00 AM on Apr. 10, 2010, the detailed information may populate Apr. 10, 2010 at 10:00 AM on the calendar of the endpoint device with the detailed information of the event. In other words, the time slot of Apr. 10, 2020 at 10:00 AM of the calendar will contain a description of the event, a location or address of the event, a telephone number for a main contact of the event and the like.

From the information on the user's endpoint device, the user may take additional action. For example, the user may click on an address provided by the detailed information to automatically map directions to the event or the user may click on the telephone number to automatically place a call to the main contact for the event, if the user has some questions about the event and so forth.

In one embodiment, the user may be charged a nominal fee (e.g. $0.99 cents) for sending the text message to the mobile messaging event planning service. In addition, the user may be charged additional fees for associated actions such as clicking on an address to map directions to the event or clicking on a telephone number to place a telephone call to the main contact for the event. The method 400 ends at step 412.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 5:
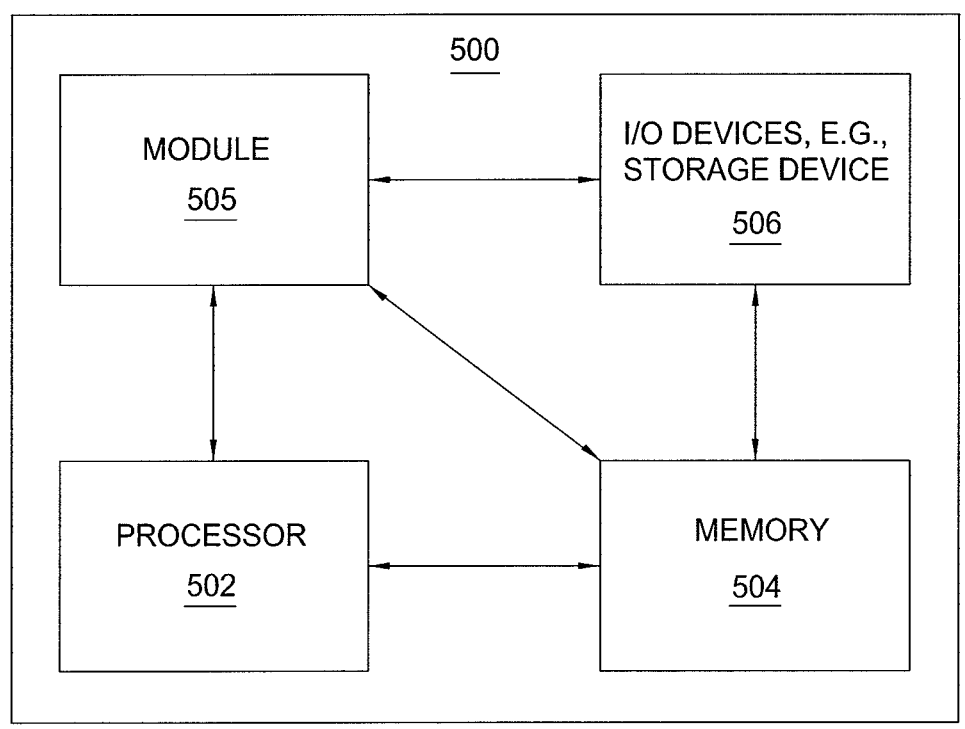
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing mobile messaging event planning, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for providing mobile messaging event planning can be loaded into memory 504 and executed by processor 502 to implement the functions as discussed above. As such, the present method 505 for providing mobile messaging event planning (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing information in a communications network, comprising:

assigning, by a processor, a mobile messaging identification code for an event associated with a third party event planner, wherein the event comprises a gathering of a group of people, wherein the mobile messaging identification code comprises a word related to an activity of the event;

receiving, by the processor, a text message including the mobile messaging identification code for the event from an endpoint device associated with a user;

looking up, by the processor, the information associated with the event based on the mobile messaging identification code, wherein the information comprises a location of the event, a time of the event and a date of the event; and providing, by the processor, the information associated with the event to the endpoint device in response to the text message.

2. The method of claim 1, wherein the event is registered with the communications network by the third party event planner.

3. The method of claim 2, wherein a service provider of the communications network collects a fee from the third party event planner for registering the event.

4. The method of claim 1, wherein the information includes an option to map directions to the location of the event.

5. The method of claim 1, wherein a calendar associated with the user sending the text message is automatically updated with the information associated with the event.

6. The method of claim 5, wherein the calendar is located on the endpoint device of the user.

7. A tangible computer-readable medium storing a plurality of instructions which, when executed by a processor, cause the processor to perform operations for providing information in a communications network, the operations comprising:

assigning a mobile messaging identification code for an event associated with a third party event planner, wherein the event comprises a gathering of a group of people, wherein the mobile messaging identification code comprises a word related to an activity of the event;

receiving a text message including the mobile messaging identification code for the event from an endpoint device associated with a user;

looking up the information associated with the event based on the mobile messaging identification code, wherein the information comprises a location of the event, a time of the event and a date of the event; and providing the information associated with the event to the endpoint device in response to the text message.

8. The tangible computer-readable medium of claim 7, wherein the event is registered with the communications network by the third party event planner.

9. The tangible computer-readable medium of claim 8, wherein a service provider of the communications network collects a fee from the third party event planner for registering the event.

10. The tangible computer-readable medium of claim 7, wherein the information includes an option to map directions to the location of the event.

11. The tangible computer-readable medium of claim 7, wherein a calendar associated with the user sending the text message is automatically updated with the information associated with the event.

12. The tangible computer-readable medium of claim 11, wherein the calendar is located on the endpoint device of the user.

13. A method for providing information in a communications network, comprising:

receiving, by an endpoint device associated with a user, a mobile messaging identification code for an event associated with a third party event planner, wherein the event comprises a gathering of a group of people, wherein the mobile messaging identification code comprises a word related to an activity of the event;

generating, by the endpoint device, a text message that includes the mobile messaging identification code for the event;

sending, by the endpoint device, the text message to look up the information associated with the event based on the mobile messaging identification code, wherein the information comprises a location of the event, a time of the event and a date of the event; and receiving, by the endpoint device, the information associated with the event in response to sending the text message.

14. The method of claim 13, wherein the text message is sent to a server storing a plurality of events, each one of the plurality of events associated with a unique mobile messaging identification code.

15. The method of claim 14, wherein the events are registered with the server by the third party event planner.

16. The method of claim 13, wherein the information is received at the endpoint device of the user for automatically populating a calendar of the endpoint device.

17. The method of claim 13, wherein the receiving, the generating and the sending are performed with a single input from a user via an application on the endpoint device of the user.

18. The method of claim 16, wherein the user is charged a fee for sending the text message and receiving the information associated with the event.

\* \* \* \* \*